United States Patent Office 2,915,436

Patented Dec. 1, 1959

1

2,915,436

PROCESS FOR THE ATTENUATION OF INFECTIOUS CANINE HEPATITIS VIRUS AND A VACCINE PREPARED THEREFROM

Arnold Howard Fieldsteel, Zionsville, Ind., assignor to Allied Laboratories, Inc., Kansas City, Mo., a corporation of Delaware No Drawing. Application April 11, 1955
Serial No. 500,679

10 Claims. (Cl. 167—78)

This invention relates to the propagation of infectious canine hepatitis virus in canine tissue cultures of the group consisting of kidney, uterus and testicle. More particularly, this invention relates to the attenuation of infectious canine hepatitis virus by serial passage in tissue cultures of canine kidney, uterus and testis.

The most important object of this invention is the preparation of a vaccine containing live attenuated ICH virus and effective for immunizing dogs against ICH (infectious canine hepatitis). ICH is a virus disease that is widespread throughout the dog population of the world. Young dogs are very susceptible to ICH, and a high percentage of infected puppies die from the disease. The death rate among older dogs is not as great as in puppies, but many dogs that recover from a natural infection of ICH are carriers and spread the disease to other susceptible dogs. In view of this tendency of ICH to be spread by carrier dogs, it is important that a method and products be made available for immunizing susceptible dogs.

It has been known in the past that susceptible dogs can be protected by the simultaneous inoculation with virulent ICH virus and immune serum. It appears, however, that this method of immunization results in a high percentage of the immunized dogs becoming carriers of the disease and hence serves to spread the infection. Vaccines prepared from tissues of dogs infected with ICH have also been prepared by inactivating the virus with agents such as, for example, formaldehyde. These killed virus vaccines are useful but have certain limitations which make it desirable that more effective vaccines be made available. The killed virus vaccines usually require a period of about two weeks after inoculation to produce immunity. The duration of immunity produced by the killed virus vaccines is usually considered to be about six months.

In accordance with the present invention, I have discovered a method for the propagation of ICH virus in tissue cultures of dog kidney, dog uterus and/or dog testicle. I have also discovered that by serial passage of ICH virus in tissue cultures of these dog tissues that, after fifty passes, the virus becomes attenuated to the point where it will not produce serious symptoms of ICH when inoculated into susceptible dogs but will stimulate an antibody response which effectively immunizes the dog.

In one method of carrying out my process for the attenuation of ICH virus, the roller tube technique has been employed for the propagation of dog kidney explants in a suitable nutrient medium, and after an outgrowth of epithelial cells are obtained, the tubes are inoculated with a suspension of dog tissue infected with ICH virus. After four to five days, serial transfers are made to new roller tube cultures of dog kidney explants. The nutrient fluid which I prefer to employ is made up of about eight parts Earle's solution (Earle, W. R., Journal of the National Cancer Institute, 1943, vol. 4, 165), about one part 5% lactalbumin hydrolysate, and about one part inactivated horse serum; the whole solution is adjusted to pH 7.6–7.8. The cultures of kidney explants can be prepared by the plasma clot method such as described by Enders et al. (Enders, J. F., Weller, T. H., and Robbins, F. C., Science, 1949, vol. 109, 85) or by trypsinizing the minced cortex of puppies in the manner described by Dulbecco and Vogt (Dulbecco, R., and Vogt, M., Journal of Experimental Medicine, 1954, vol. 99, 167). Kidneys used are preferably obtained from two- to six-week-old puppies from hyper-immunized bitches or from older puppies that have been immunized against ICH to guard against accidental pickup of virulent ICH. After about the fiftieth serial passage of the ICH virus in the roller tube cultures of dog kidney, the virus is attenuated so that it can be used for actively immunizing dogs against ICH without producing the usual pathological symptoms of ICH. The liquid material containing the attenuated virus can be used directly as a vaccine, and when maintained in sterile condition will retain the attenuated virus in a form suitable for producing active and solid immunity. When desired, the liquid vaccine can be dried from the frozen state, and the dried material can be diluted at some later time with a suitable liquid for use as a vaccine.

It appears that roller tube cultures of canine kidney are ideally suited for the initial cultivation and attenuation of ICH. In accordance with my invention, however, suspended cell cultures of canine tissues selected from the group consisting of kidney, uterus and testis, or combinations thereof in suitable nutrient fluids, may be employed for propagation of attenuated ICH and the preparation of a vaccine therefrom.

The manner in which my invention is carried out will be described in greater detail in conjunction with the following specific experiments. It is understood that these specific experiments are by way of illustration and not by limitation.

PROPAGATION OF THE VIRUS

During the course of experiments involving the use of roller tube pig kidney cortex tissue cultures, 0.2 ml. of a 20% suspension of dog liver infected with virulent ICH virus was inoculated into each of several of these tubes. The nutrient fluid employed in the tubes was made of eight parts of Earle's balanced salt solution (sodium chloride 6.8 g., potassium chloride 0.40 g., calcium chloride 0.20 g., magnesium sulfate 0.20 g., sodium acid phosphate 0.125 g., glucose 1.00 g., sodium bicarbonate 2.20 g., water to make 1000 ml.), one part of 5% lactalbumin hydrolysate and one part inactivated horse serum. The nutrient fluid was adjusted to pH 7.6–7.8. Serial transfers of 0.2 ml. of undiluted tissue culture fluid were transferred to new tubes at four day intervals. No cytologic effects of the virus were noted on the cells of the pig kidney tissue in any tubes at any passage level. However, the fifth passage material when diluted $10^{-3}$ and inoculated in 0.2 ml. amounts subcutaneously in two dogs resulted in the death of one animal with typical gross pathological lesions of ICH and a febrile response in the other which was found to be immune on challenge with the original infected dog liver material. This tissue culture fluid represented a dilution of $10^{-8.7}$ of the original material which had a titer in dogs of only $10^{-6.5}$ when 1 ml. was injected intravenously. At the seventh passage level in pig kidney, the undiluted fluid inoculated into two dogs resulted in the death of both with typical signs and lesions. However, at the eighth passage level, no virus was found. It seemed possible that virus growth had occurred but at a low level.

Roller tube cultures employing the same nutrient medium described above were then prepared from spleen and whole kidney of two-week-old dogs. Some of these were inoculated with 0.2 ml. of undiluted fluid from the third pig kidney passage and some with 0.2 ml. of a 20% suspension of dog liver infected with ICH. No effect of the virus was noted in either set of tubes until the sixth day of incubation. At that time only the epithelial cells in the dog kidney cultures showed marked cytologic changes. The cells were rounded and highly refractile. The epithelial sheets had been broken up and cells formed in small groups like clusters of grapes. The fibroblasts present in the same cultures were unaffected and continued to grow although eventually there was complete degeneration of the epithelial cells. No effects of the virus were seen in the spleen cultures which contained only fibroblasts. The supernatant fluids from the kidney cultures were removed and serial passage of 0.2 ml. of undiluted fluid was carried out. On subsequent passages the effect occurred after 24–48 hours incubation and passages were made at two or three day intervals.

Identification of the tissue culture virus was made at the tenth passage level at whihc time the titer of the virus was $10^{-5.6}$. A puppy which was susceptible to ICH was inoculated with ICH virus of canine origin, known to be free from contamination by canine distemper virus. This dog developed a high fever and eventually recovered. Two more injections of this virus were made, two and three weeks after the original inoculation. The dog was then bled and the serum removed for neutralization tests. The serum had a neutralizing index of 250,000+ and a 50% serum dilution endpoint of 1:4096 against one hundred tissue culture doses of virus.

NEUTRALIZATION TESTS

At the eleventh tissue culture passage, a large pool of virus was prepared which had a titer of $10^{-6.2}$ in tissue culture and at least $10^{-7.5}$ in dogs. However, it was obvious at this time that dependence upon a febrile reaction in dogs as an indication of ICH infection was most unreliable. Even though litters were used and one dog of each litter was always tested for susceptibility, an occasional litter was found in which there were both susceptible and resistant animals. The quantitative neutralization test offered a positive method of diagnosis and, at the same time, a method for testing the susceptibility of each dog in a litter before use in a test. For these tests each dog was bled before inoculation and two and three weeks after inoculation. Decimal dilutions of sera were made in the tissue culture nutrient fluid, each dilution being mixed with an equal quantity of virus so that each 0.2 ml. of serum-virus mixture contained 100–320 $TCIC_{50}$ (50% tissue culture infective dose) of ICH virus. The mixtures were incubated at 37° C. and each then inoculated into four tubes. Final dilutions of serum ranged from $10^{-1}$ to $10^{-4}$. No sera were ever tested undiluted since it had been found that a large percentage of young dogs carry a small amount of passively transferred neutralizing antibody against ICH but not sufficient to protect against ICH infection. Simultaneous titrations of virus were always carried out, using four tubes per dilution. Final readings were made at five to six days when the control titration showed 100–320 $TCID_{50}$ of virus to be present. Results are given as the 50% serum dilution endpoint as calculated according to the formula of Reed and Muench (Reed, L. J., and Muench, H., American Journal of Hygiene, 1938, vol. 27, 493). In Table I are summarized the data of a typical titration in dogs with the results of serum neutralization tests.

*Table I.—Titration of eleventh passage tissue culture ICH virus in dogs and the result of neutralization tests*

| Dog No. | Virus Dilution | Clinical Response | Reciprocal of 50% Serum Dilution Endpoint Against 100–320 $TCID_{50}$ of ICH Virus | | |
|---|---|---|---|---|---|
| | | | Pre-Inoculation | 2-week Convalescent | 3-week Convalescent |
| 171 | $10^{-2}$ | $F_4$ | 4 | 3,160 | 3,160 |
| 172 | | $F_5$ | 4 | 316 | 3,160 |
| 166 | $10^{-3}$ | $F_4$ | 4 | 2,160 | 10,000 |
| 167 | | $F_4$ | 4 | 3,160 | 4,650 |
| 169 | $10^{-4}$ | $F_4$ | 4 | 2,150 | 3,200 |
| 170 | | $F_5$ | 4 | 3,200 | 3,200 |
| 164 | $10^{-5}$ | $F_3$ | 4 | 3,200 | 3,200 |
| 168 | | $F_4$ | 4 | 1,000 | 21,500 |
| 163 | $10^{-6}$ | $F_4$ | 4 | 215 | 1,000 |
| 165 | | $F_4$ | 4 | 2,150 | 3,200 |
| 161 | $10^{-7}$ | $F_6D_{12}$ | 4 | ---- | ---- |
| 162 | | $F_6$ | 4 | 3,200 | 3,200 |

F=Onset of febrile reaction on designated day.
D=Died 12 days post-inoculation.

Although no endpoint was attained in this titration, it is apparent that the dogs were highly susceptible to infection with the tissue culture virus and that high levels of antibody were attained as early as eight days after the clinical response was first noted. The value of the neutralization test is further emphasized by the fact that the febrile response in most dogs was not remarkable, and none of the dogs developed corneal opacity which is pathognomonic of the disease and generally develops in about 25% of convalescent dogs.

ATTENUATION OF THE VIRUS

Serial passage of the virus was maintained over a period of many months with occasional repassage of undiluted virus back in the dog to test for virulence and to check on the specificity of the cytopathogenic effect. At the fortieth passage it was noted the virus still produced a febrile reaction, but that no reaction to the virus was produced at the fifty-first and fifty-fourth passages. The dogs inoculated with passage number forty were challenged with a strain of fox encephalitis virus which was highly virulent for dogs, and the others were challenged with virulent dog passaged ICH virus. All animals resisted challenge. To rule out the possibility that they could have been immune prior to inoculation with the tissue culture virus, neutralization tests were carried out on the sera with the results shown in Table II.

*Table II.—Results of passage of ICH virus in tissue culture, showing loss of virulence for dogs without loss of antigenicity*

| Virus Inoculum | Dog No. | Clinical Response To Virus | Reciprocal of 50% Serum Dilution Endpoint Against 100–320 $TCID_{50}$ of ICH Virus | | |
|---|---|---|---|---|---|
| | | | Pre-Inoculation | 2-week Convalescent | 3-week Convalescent |
| Natural infection | 133 | ---- | 4,650 | ---- | ---- |
| | 136 | ---- | 21,500 | ---- | ---- |
| Original [1] | 95 | $F_4$ | 4 | 2,150 | 10,000 |
| | 96 | $F_3$ | 4 | 465 | 3,200 |
| T.C. 11 | 184 | $F_8E_{12}$ | 4 | 1,000 | 3,200 |
| T.C. 23 | 190 | $F_3$ | 4 | 320 | 3,200 |
| | 192 | $F_4E_{14}$ | 4 | 3,200 | 4,650 |
| T.C. 40 | 194 | $F_4$ | 4 | 465 | 3,200 |
| | 195 | $F_4$ | 4 | 2,150 | 4,650 |
| T.C. 51 | 204 | Negative | 4 | 3,200 | 21,500 |
| | 205 | do | 4 | 2,150 | 10,000 |
| T.C. 54 | 206 | do | 4 | 32 | 465 |
| | 207 | do | 4 | 2,150 | 4,650 |
| | 208 | do | 4 | 3,200 | 10,000 |

[1] 20% suspension of dog liver infected with virulent ICH.
F=Febrile response lasting designated number of days.
E=Transient corneal opacity appearing on designated day.

The results of the neutralization tests set forth in Table II show that the antibody response to my attenuated ICH virus compares favorably to that of dogs 133 and 136 that have recovered from a natural infection of ICH and to that of dogs 95 and 196 that were inoculated with virulent ICH.

To further prove modification of the virus, various passage levels of the virus were inoculated back into dogs to determine if modification had occurred. The results are summarized in Table III.

*Table III*

| Tissue Culture Passage Number | No. of Dogs Inoculated | Febrile Response | | Corneal Opacity | | Deaths | |
|---|---|---|---|---|---|---|---|
| | | No. | Percent | No. | Percent | No. | Percent |
| 10 | 2 | 2 | | 0 | | 1 | |
| 11 | 17 | 17 | | 2 | | 3 | |
| 13 | 5 | 5 | 100 | 0 | 12 | 3 | 32 |
| 14 | 8 | 8 | | 0 | | 4 | |
| 23 | 9 | 9 | | 3 | | 3 | |
| 40 | 2 | 2 | | 0 | | 0 | |
| (1) 51 | 2 | 0 | | 0 | -------- | 0 | |
| (1) 54 | 3 | 0 | | 0 | -------- | 0 | |
| (1) 60 | 4 | 1 | 16 | 0 | -------- | 0 | 0 |
| (1) 70 | 4 | 0 | | 0 | -------- | 0 | |
| (1) 74 [2] | 30 | 6 | | 1 | -------- | 0 | |
| (1) 87 [3] | 12 | 2 | | 0 | -------- | 0 | |

[1] 25 of 26 litter mate controls developed a fatal infection when inoculated with virulent virus.
[2] 70 rapid passages undiluted, 4 passages at limiting dilutions.
[3] 70 rapid passages undiluted, 17 passages at limiting dilutions.

PROPAGATION OF ICH VIRUS IN SUSPENDED CELL CULTURES OF CANINE UTERUS, CANINE TESTIS AND CANINE LIVER

Uterus and testis tissues of dogs, freshly obtained from dogs up to 9 weeks of age, were minced into pieces of 1–2 mm. in diameter and washed in phosphate buffered saline. 10 to 20 pieces were then distributed in rubber stoppered 25 ml. Erlenmeyer flasks containing 3 ml. of the nutrient fluid. Incubation of these cultures were carried out at 35° C.

ICH virus from the eighty-sixth passage level in kidneys was propagated in suspended cell cultures of canine uterus and testis. 25 ml. Erlenmeyer flasks containing minced pieces of either uterus or testis and 3 ml. of nutrient fluid were inoculated with 0.1 ml. of $10^{-3}$ dilutions of virus from the previous passage and harvested after 7 days incubation. In this manner, the virus was propagated in testis cultures for 4 serial passages and in uterus cultures for 10 serial passages. The titer of virus produced was comparable to that produced in roller tube cultures of kidney ranging up to $10^{-7.7}$ doses of virus per ml. of fluid. Fluid vaccines have been harvested from these uterus and testis cultures which stimulate the production of protective infectious canine hepatitis antibodies when injected into non-immune dogs without producing the usual pathological symptoms of infectious canine hepatitis.

Suspended cell cultures of canine uterus and testicle tissues are also suitable for initial isolation and propagation of virulent ICH virus from tissues of infected animals. For example, 3 flasks of suspended uterine tissue cells were inoculated with 0.1 ml. of a 1:50 dilution of liver from an infected dog. (This was the same material used to initiate growth of ICH virus in the original kidney cultures.) Aliquots of these fluids were removed after mixing, pooled and a titration carried out in roller tube cultures of kidney to determine the amount of virus present. The fluids titered $10^{-4.0}$ per ml. One week later the fluids were removed and pooled and the titer was found to be $10^{-7.7}$ per ml. Thus there was a 5000-fold increase in virus.

Thus the serial passage of infectious canine hepatitis virus in suspended cell cultures of dog kidney, dog uterus and dog testis for at least 50 serial passages results in the attenuation of ICH virus to the point where it will stimulate the production of protective antibodies in non-immune dogs without producing the usual pathological symptoms. It is contemplated that the attenuation may be brought about by serial passage in combinations of these tissue cultures or in successive tissue cultures. For example, 25 serial passages may be carried out in kidney cultures, followed by 25 serial passages in uterus tissue culture and result in the attenuation of a virulent strain of ICH virus. Similarly combinations of these tissues in suitable nutrient fluids may be used for the propagation of the attenuated ICH virus and result in the production of a satisfactory vaccine for protecting dogs against ICH infections.

BULK VACCINE PRODUCTION USING THE ATTENUATED VIRUS

In this process five liter bottles containing 5 grams of minced fresh dog kidney suspended in 500 ml. of medium No. 199 (Morgan, J. F., Morton, H. J., and Parker, R. C., Proceedings of the Society for Experimental Biology and Medicine, 1950, vol. 73, 1) are inoculated with the attenuated ICH virus (fiftieth or higher passage) and incubated at 35° C. while being gently rocked. After propagation for about five to seven days, the fluid is harvested and separated from the tissue material. The liquid has a high virus concentration and is suitable for direct use as an ICH vaccine, or it may be dried from the frozen state and subsequently restored to a liquid form at the time of use.

In summary, it is seen that my invention provides a process of attenuating virulent ICH virus which attenuated virus is useful for the production of a vaccine capable, when injected parenterally into dogs, of immunizing them against ICH within a few days following vaccination and without producing any pathological symptoms of the disease. The attenuation process comprises passing virulent ICH virus serially through tissue cultures of dog kidney, dog uterus and/or dog testicle for a sufficient number of passages to materially reduce the normal ICH death rate of dogs infected therewith. At about the fortieth passage, substantial attenuation occurs; but preferably fiftieth or greater passage virus is best for vaccine use.

The particular nutrient medium which I have employed in the roller tube process results in a luxurious growth of the epithelial cells of the dog kidney tissue explants. In the attenuation process, epithelial cell growth appears desirable from the standpoint of determining the presence of and for measuring a healthy growth of the virus in each passage. Other nutrient mediums suitable for stimulating epithelial growth of dog kidney tissue explants may be employed; for example, medium No. 199 plus 10% horse serum. It appears that horse serum which has been inactivated by heat treatment is one of the essential ingredients of the nutrient medium where kidney epithelial cell growth is to be obtained. Thus, for growing tissue using the roller tube process and propagation of ICH virus therein, suitable nutrient fluids comprise those such as Earle's balanced salt solution plus lactalbumin hydrolysate plus horse serum, or medium No. 199 plus horse serum. Using the suspended cell culture technique, the nutrient fluids used in the roller tube process are satisfactory or medium No. 199 alone may be used.

In the particular nutrient medium employed, at least about forty serial passages of the ICH virus are required to attenuate it to the point where it can be injected into non-immune dogs without producing severe pathological symptoms of ICH. At about fifty or more passages, the virus is attenuated to the point where it does not produce even a febrile response when injected into non-immune dogs; and ICH of at least this number of serial passages is preferred.

The attenuated ICH virus produced by my process is capable of stimulating the production of protective ICH antibodies when injected into non-immune dogs without producing the usual pathological symptoms of ICH. The vaccine may comprise simply the filtered or clarified liquid nutrient medium containing the attenuated ICH. From a commercial standpoint, it may be desirable that the clarified liquid nutrient containing the attenuated ICH virus be rapidly frozen and dried from the frozen state. In certain cases suitable antibiotics such as penicillin and streptomycin may be added to the vaccine substance.

Foxes, wolves, coyotes, jackals, and other members of the canine species are susceptible to ICH and/or fox encephalitis so my attenuated vaccine is useful for protecting them against these infections.

Because of the availability of dog tissues, they are preferred as the tissues in my attenuation and vaccine production process; however, corresponding tissues of foxes, wolves, coyotes, jackals, and other members of the canine species may be used.

The tissue culture technique employed in my process results in the production of a vaccine containing a relativley high concentration of the living, attenuated ICH virus. In many cases, the infected tissue culture fluid has a titer of $10^{-7}$ as determined by titrating the virus in tissue culture. As little as 0.2 ml. of tissue culture fluid of this dilution is capable of producing a cytopathogenic effect in tissue culture and could, therefore, be expected to provide an immunizing dose when injected into a non-immune dog.

Even though my attenuated ICH virus does not produce the usual pathological symptoms of ICH when non-immune dogs are inoculated therewith, there is undoubtedly growth of the virus in the dog. It is probable that suitable tissues from such inoculated dogs harvested at four to eight days following inoculation could be used in the preparation of a vaccine suitable for immunizing other susceptible dogs against ICH. The preparation of a vaccine in this manner, using my attenuated ICH virus, is considered within the scope of the present invention. Similarly, it is probable that my attenuated ICH virus could be alternately passed from tissue culture to dog to tissue culture for a reasonable number of such alternate passes and still remain attenuated and is thus likewise considered within the scope of my invention.

This application is a continuation in part of my copending application, Serial No. 427,355, filed May 3, 1954, now abandoned.

I claim:

1. A process of attenuating infectious canine hepatitis virus for the production of a vaccine capable when injected into dogs of immunizing them against infectious canine hepatitis, which comprises introducing an inoculum of virulent infectious canine hepatitis virus into a nutrient fluid tissue culture medium which is non-toxic to said virus and which contains viable cells of tissues of the group consisting of canine kidney, canine uterus and canine testicle incubating said nutrient fluid tissue culture medium until a cytologic effect is produced on said tissue, thereafter separating an inoculum of said virus and serially passing the virus through other such tissue cultures for not less than about 50 passages.

2. A process of attenuating infectious canine hepatitis virus for the production of a vaccine capable when injected into dogs of immunizing them against infectious canine hepatitis, which comprises introducing an inoculum of virulent infectious canine hepatitis virus into a nutrient fluid tissue culture medium which is non-toxic to said virus and which contains viable cells of canine kidney incubating said nutrient fluid tissue culture medium until a cytologic effect is produced on said tissue, thereafter separating an inoculum of said virus and serially passing the virus through other such tissue cultures for not less than 50 passages.

3. A process of attenuating infectious canine hepatitis virus for the production of a vaccine capable when injected into dogs of immunizing them against infectious canine hepatitis, which comprises introducing an inoculum of virulent infectious canine hepatitis virus into a nutrient fluid tissue culture medium which is non-toxic to said virus and which contains viable cells of canine uterus incubating said nutrient fluid tissue culture medium until a cytologic effect is produced on said tissue, thereafter separating an inoculum of said virus and serially passing the virus through other such tissue cultures for not less than 50 passages.

4. A process of attenuating infectious canine hepatitis virus for the production of a vaccine capable when injected into dogs of immunizing them against infectious canine hepatitis, which comprises introducing an inoculum of virulent infectious canine hepatitis virus into a nutrient fluid tissue culture medium which is non-toxic to said virus and which contains viable cells of canine testicle incubating said nutrient fluid tissue culture medium until a cytologic effect is produced on said tissue, thereafter separating an inoculum of said virus and serially passing the virus through other such tissue cultures for not less than 50 passages.

5. A process of attenuating infectious canine hepatitis virus for the production of a vaccine capable when injected into dogs of immunizing them against infectious canine hepatitis, which comprises introducing an inoculum of virulent infectious canine hepatitis into a nutrient fluid culture medium of the group consisting of Earle's balanced salt solution plus minor quantities of lactalbumin hydrolysate and inactivated horse serum, medium No. 199, and medium No. 199 plus a minor quantity of horse serum, and which nutrient fluid contains viable cells of tissues of the group consisting of canine kidney, canine uterus and canine testicle incubating said nutrient fluid tissue culture medium until a cytologic effect is produced on said tissue, thereafter separating an inoculum of said virus and serially passing the virus through other such tissue cultures for not less than 50 passages.

6. A process of attenuating infectious canine hepatitis virus for the production of a vaccine capable when injected into dogs of immunizing them against infectious canine hepatitis, which comprises introducing an inoculum of virulent infectious canine hepatitis into a nutrient fluid culture medium of the group consisting of Earle's balanced salt solution plus minor quantities of lactalbumin hydrolysate and inactivated horse serum, medium No. 199, and medium No. 199 plus a minor quantity of horse serum, and which nutrient fluid contains viable cells of canine kidney incubating said nutrient fluid tissue culture medium until a cytologic effect is produced on said tissue, thereafter separating an inoculum of said virus and serially passing the virus through other such tissue cultures for not less than 50 passages.

7. A process of attenuating infectious canine hepatitis virus for the production of a vaccine capable when injected into dogs of immunizing them against infectious canine hepatitis, which comprises introducing an inoculum of virulent infectious canine hepatitis into a nutrient fluid culture medium of the group consisting of Earle's balanced salt solution plus minor quantities of lactalbumin hydrolysate and inactivated horse serum, medium No. 199, and medium No. 199 plus a minor quantity of horse serum and which nutrient fluid contains viable cells of canine uterus incubating said nutrient fluid tissue culture medium until a cytologic effect is produced on said tissue, thereafter separating an inoculum of said virus and serially passing the virus through other such tissue cultures for not less than 50 passages.

8. A process of attenuating infectious canine hepatitis virus for the production of a vaccine capable when injected into dogs of immunizing them against infectious canine hepatitis, which comprises introducing an inoculum of virulent infectious canine hepatitis into a nutrient fluid culture medium of the group consisting of Earle's balanced salt solution plus minor quantities of lactalbumin hydrolysate and inactivated horse serum, medium No. 199, and medium No. 199 plus a minor quantity of horse serum, and which nutrient fluid contains viable cells of canine testicle incubating said nutrient fluid tissue culture medium until a cytologic effect is produced on said tissue, thereafter separating an inoculum of said virus and serially passing the virus through other such tissue cultures for not less than 50 passages.

9. A process of preparing an infectious canine hepatitis vaccine which comprises propagating an attenuated infectious canine hepatitis virus capable when injected into dogs of immunizing them against infectious canine hepatitis; which attenuation was produced by introducing an inoculum of virulent infectious canine hepatitis into a nutrient fluid culture medium which is non-toxic to said virus and which contains viable cells of tissues of the group consisting of canine kidney, canine uterus and canine testicle, incubating said nutrient fluid until a cytologic effect is produced on said tissue, thereafter separating an inoculum of said virus and serially passing the virus through other such tissue cultures for not less than 50 passages; by introducing an inoculum of said attenuated virus into a nutrient fluid culture medium which is non-toxic to said virus and which contains viable cells of tissues of the group consisting of canine kidney, canine uterus and canine testicle, incubating said tissue culture medium at a temperature of from about 35° to about 39° C. until said fluid medium contains at least 1 and up to about 10,000,000 tissue culture infectious doses of said attenuated virus per ml. and harvesting the fluid vaccine.

10. An infectious canine hepatitis vaccine, containing at least 1 and up to about 10,000,000 tissue culture infectious doses of virus per ml., capable of stimulating the production of protective infectious canine hepatitis antibodies, comparable to those produced by natural infections, when injected into non-immune dogs and without producing the usual pathological symptoms of infectious canine hepatitis, made by the process of claim 9.

References Cited in the file of this patent

Morse et al.: Proc. Soc. Exptl. Biol. and Med., October 1953, pp. 10–12.

Miles et al.: Nature, Oct. 20, 1951, pp. 699, 700.

Enders: Proc. Coc. Exptl. Biol. and Med., January 1953, pp. 100–104.

Morann et al.: Proc. Soc. Exptl. Biol. and Med., 1953, vol. 84, No. 3, pp. 558–563.

Science Newsletter, Nov. 21, 1953, p. 323.

Younger: Proc. Soc. Exptl. Biol. and Med., February 1954, pp. 527–530.

Cabasso et al.: Proc. Soc. Exptl. Biol. and Med., April 1954, pp. 239–245 (Sub. for Pub. Dec. 16, 1953).